May 15, 1951 J. GREEN 2,553,368

AUTOMATIC FREQUENCY CONTROL FOR TELEVISION RECEIVERS

Filed Jan. 7, 1950

INVENTOR.
JULIUS GREEN
BY
Brown, Denk & Synnestvedt
AGENTS

Patented May 15, 1951

2,553,368

UNITED STATES PATENT OFFICE 2,553,368

AUTOMATIC FREQUENCY CONTROL FOR TELEVISION RECEIVERS

Julius Green, Philadelphia, Pa., assignor to Philco Corporation, Philadelphia, Pa., a corporation of Pennsylvania Application January 7, 1950, Serial No. 137,440

8 Claims. (Cl. 178—5.8)

Figure 1:
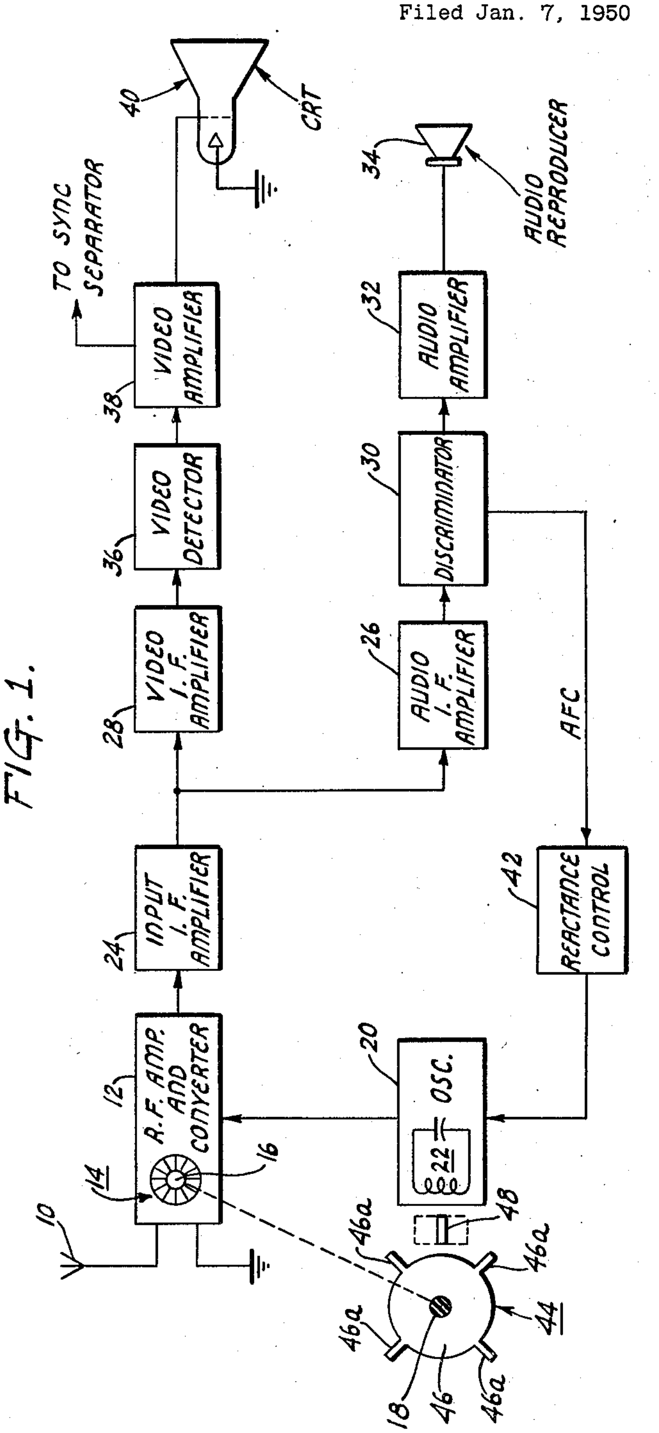

This invention relates to an automatic frequency control device for television receivers.

Under present standards, the video and audio components of a composite television signal are transmitted on separate carriers between which a fixed frequency difference is maintained. At the receiver, it is customary to employ a single oscillator which beats with the received energy to provide two intermediate-frequency (IF) signals in the respective video- and audio-reproducing channels. In many cases, an automatic frequency control (AFC) circuit is provided by means of which a D.-C. potential is obtained from the discriminator in the audio channel, and this control potential is applied to govern the action of the oscillator in such a manner as to raise or lower its frequency as necessary to maintain at all times the desired intermediate frequency. This compensates for any frequency drift in the received signal, as well as for any small frequency drifts that may arise within the receiver itself.

In a system of the nature described above, the discriminator in the audio section of the receiver must be designed to develop an adequate AFC voltage output over the full bandwidth through which the IF signal may vary as the receiver is tuned to a particular channel. This bandwidth, or range, of the audio discriminator necessary for AFC control is much greater than that normally required to effect a demodulation of the audio signal. This requirement for the audio discriminator reduces its effective sensitivity, and may require that the gain of the audio channel be raised by the addition of one or more stages of IF amplification. The result is an increase in the complexity as well as the overall cost of the television receiver.

In a copending United States patent application of Albert R. Alter, Serial No. 101,465, filed June 25, 1949, there is disclosed a system whereby the bandwidth of the audio discriminator is made only as wide as is necessary for proper sound demodulation. In one embodiment of the invention set forth in this copending application, an inductance-capacitance network is provided in conjunction with the AFC circuit, and a positive voltage is developed across the capacitance of this L-C network during the relatively short period of time that the receiver channel selector is being manually actuated from one channel to another. Following this manipulation, and when the desired channel has been tuned in, the capacitance of the L-C network is in effect shunted by the inductance, and an oscillatory action occurs which causes the potential across the capacitor to take the form of a damped sinusoidal wave—that is, the voltage on the capacitor drops to zero, rises in a negative direction, and then finally returns to zero. If this varying capacitor potential is applied to the grid of the reactance tube which governs the frequency of the local oscillator, the latter may be made similarly to vary in the frequency. During this frequency variation, the IF signal in the audio channel will sweep across the response curve of the discriminator. This results in the development of an AFC control voltage from the discriminator which is of sufficient amplitude to lock in the local oscillator to its proper frequency.

Although the system set forth in the abovementioned copending application operates satisfactorily, it necessitates the use of a number of additional circuit components. It has been found that substantially the same pull-in action developed by the electrical arrangement described in the Alter application may be achieved purely by mechanical means with a consequent simplification of the receiver structure.

In the described Alter application, the local oscillator is caused to "hunt" for the signal whenever the receiver is tuned from one channel to another, and this is accomplished by the energization of a resonant circuit. In accordance with one feature of the present invention, however, the electrical components which were required to bring about the "hunting" action in the Alter disclosure are replaced by a simple mechanical arrangement which achieves comparable results merely through a change in the position of an oscillatable member relative to a fixed electrical portion of the receiver, such, for example, as the local oscillator tank circuit. In one embodiment, this oscillatable member may comprise an element of magnetic material which is attached to one end of a spring the other end of which is secured to the receiver chassis. If this spring element be so associated with the receiver channel selector knob that any movement of the latter to tune the receiver from one channel to another causes the spring to be set in vibration, then the magnetic element will change its position relative to the oscillator tank circuit correspondingly to vary the resonance of the latter. The relative position of the magnetic element relative to the resonant circuit, as well as its physical characteristics, may be so chosen that the range over which the oscillator frequency is varied will be such that the latter is swept through the response curve of the audio discriminator, and hence an AFC control voltage will be developed. With a properly designed AFC circuit, the response thereof will be sufficiently fast to "hang on" until the vibration of the spring ceases.

One object of the present invention, therefore, is to provide an improved automatic frequency control arrangement for television receivers.

Another object of the invention is to provide, in an automatic frequency control arrangement for television receivers of the type wherein the AFC control voltage is derived from the output of the discriminator in the audio channel of the receiver, means whereby the bandwidth of such discriminator need only be sufficiently wide adequately to reproduce the audio signal.

A further object of the invention is to provide, in a television receiver of the type described, an AFC pull-in device which is mechanically actuated as a function of the operation of the receiver tuning mechanism, thereby to bring the local oscillator signal within the lock-in range of the AFC circuit.

Figure 2:
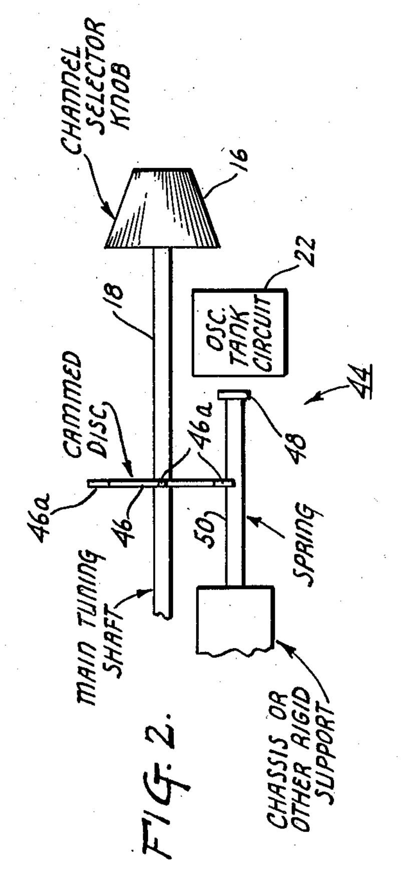

Other objects and advantages will be apparent from the following description of a preferred form of the invention and from the drawings, in which:

Fig. 1 is a schematic illustration of a television receiver embodying an automatic frequency control circuit in accordance with the present invention; and Fig. 2 illustrates in greater detail certain features of the AFC pull-in arrangement of Fig. 1.

To the foregoing general ends it is a feature of the present invention to provide, in an AFC system for television receivers of the type in which the output of a local oscillator is heterodyned with a television signal containing both audio and video information, and in which the receiver includes in the audio section thereof a frequency discriminator the bandwidth of which exceeds only slightly the normal bandwidth of the audio IF signal (the latter being subject to fluctuations beyond the range of the discriminator during a tuning of the receiver from one channel to another) and means for deriving from the discriminator an AFC voltage whenever the audio IF signal departs from a center IF frequency but remains within the range of the discriminator, an oscillatable element, means for causing said element to oscillate in response to a tuning of the receiver from one channel to another, and means for causing the oscillation of said element to vary the frequency of the local oscillator in such a manner that the audio IF signal is brought within the frequency range of the discriminator in the event that it does not then lie within such range.

Referring first to Fig. 1 of the drawings, there is shown in more or less schematic fashion a television receiver of the superheterodyne type incorporating a preferred form of the present invention. Inasmuch as a number of the components of this receiver are of a conventional nature, they have been illustrated by appropriately-labeled blocks in order to simplify the drawing. In general, the receiver includes an antenna 10 from which incoming signals are fed to an R.-F. amplifier and converter 12. The latter includes a manually-operable channel selector switch 14, the function of which is to tune the receiver to the particular television broadcasting station which the operator desires to receive. The channel-selecting portions of the switch 14 form no part of the present invention, and hence have not beein illustrated. One suitable form of mechanism which might be employed, however, is shown in a copending United States patent application of L. H. Zepp et al., Serial No. 736,435, filed March 22, 1947, now Patent No. 2,545,681, granted March 20, 1951. It need only be mentioned in the present application that the channel selector switch 14 includes a knob 16 which is securely attached to a main tuning shaft 18 (see also Fig. 2).

In order to produce suitable audio and video IF signals, a local oscillator 20 is provided, the output of which is heterodyned with the composite television signal received by the antenna 10. Oscillator 20 may be of any suitable type known in the art which includes an inductance-capacitance, or tank, circuit 22.

The output of the RF amplifier and converter 12, containing both the audio and video information in the composite television signal, is applied to an input IF amplifier 24. The output of the latter consists of two IF carriers, one of which is modulated with the picture, or video, signals and the other of which is modulated with the accompanying sound, or audio, signals. The latter are amplified by one or more audio IF stages 26, while the former are amplified by one or more video IF amplifier stages 28. The sound IF signals are impressed upon a discriminator, or sound detector, 30 which acts to develop an audio detected signal in the usual manner. The latter is then amplified in the audio amplifier 32 and reproduced by some suitable device such as a loundspeaker 34.

The video IF signals, on the other hand, are applied to the picture second detector 36, which demodulates the video signals. The picture information thus derived is amplified in the video amplifier 38 and employed to modulate the electron scanning beam of a cathode-ray tube, or other image-reproducing device, 40. It will be understood that the synchronizing signal information in the composite television signal is separated from the video information by some suitable means, preferably associated with the amplifier 38, which may be of standard design and which therefore has not been illustrated. It is likewise assumed that a suitable "D.-C. restoring circuit" is utilized in the video channel of the receiver to supply the proper background illumination for the image reproduced by tube 40.

Since the present invention is not concerned with the foregoing circuits, except insofar as they cooperate with the elements of applicant's invention to be hereinafter described, a further description thereof is not believed to be necessary, although reference is again made to the abovementioned Zepp et al. application for a more extended discussion.

In order to maintain at all times a center IF signal of predetermined frequency in both the audio and video channels of the television receiver, an automatic frequency control circuit is utilized. This circuit makes use of a control voltage derived from the discriminator 30. For example, if the audio IF output of the amplifier 26 departs from a predetermined center frequency, a control voltage will be obtained from the discriminator 30 the magnitude of which will vary as a function of the degree of departure of the IF signal from this center frequency, and the polarity of which will depend upon the direction of this frequency departure. A discriminator circuit operating in accordance with these principles is set forth in United States Patent No. 2,121,103, issued June 21, 1938, to S. W. Seeley, and hence a detailed description of such apparatus will not be given. It is deemed sufficient to state that a direct-current voltage (AFC bias) is derived from the IF energy, and that the polarity and magnitude of this bias is dependent upon the sense and amount of frequency shift of the IF carrier from its preassigned frequency. The specific construction of the discriminator 30 forms no part of the present invention, and any type of circuit may be used as long as it is capable of converting a frequency shift in the IF signal into a representative D.-C. voltage variation.

The output of discriminator 30 (which may be filtered if necessary or desirable) is applied as a bias potential to a reactance control circuit 42. The latter may also be of any suitable type known in the art, such for example, as that described in the copending Alter application above-mentioned. It may, for example, include an electron discharge device which is so connected as to place an effective inductive reactance across the tank circuit 22 of the oscillator 20. Thus, if the AFC voltage applied to the unit 42 is positive, the inductance of the coil in the tank circuit 22 is effectively increased in value thereby causing the output frequency of the oscillator 20 to decrease. Conversely, if the AFC voltage output of the discriminator 30 is negative, the inductance of the coil of the tank 22 is effectively decreased, thereby raising the local oscillator frequency. In this manner, a control signal from the discriminator 30 governs the action of the reactance control unit 42 so as to raise or lower the frequency of the local oscillator 20 as necessary to maintain at all times the preassigned intermediate frequency. This compensates for any frequency drift in the incoming signal received by antenna 10, as well as for any frequency drifts that may arise within the receiver itself.

In the circuit as described above, it will be seen that the discriminator 30 must be designed to provide an adequate AFC control voltage output over the full frequency band through which the IF signal may vary as the television receiver is tuned from one channel to another through manipulation of the channel selector knob 16. If the discriminator bandwidth is not great enough to include these frequency swings, no AFC control voltage output will be produced from the discriminator 30 when the IF signal is outside the discriminator range.

Accordingly, in commercial receivers embodying the above-described AFC arrangement, the bandwidth of the discriminator 30 is greatly in excess of the bandwidth required for proper sound demodulation. This results in an audio output of relatively low level unless an excessively large number of IF amplifier stages are employed preceding the discriminator 30. As above brought out, the use of additional IF stages is costly, and, in addition, renders the receiver unnecessarily complex.

In accordance with one feature of the present invention, the bandwidth of the discriminator 30 is made only as wide as is necessary for proper sound demodulation. Normally, this would not result in the development of an adequate AFC control voltage when the receiver is switched from one channel to another, inasmuch as the center IF frequency may be outside the response curve of the discriminator 30, and, if so, no appreciable control potential is generated for application to the reactance control unit 42. To meet this possibility, the present invention makes use of a pull-in device generally indicated in Figs. 1 and 2 by the reference numeral 44.

This pull-in device 44 may consist of a cammed disc 46 mounted on the main tuning shaft 18 (or on a separate shaft which is ganged to and rotates with the shaft 18) and an element 48 which is securely affixed to one end of a spring member 50. The other end of the spring member 50 is held in position by the receiver chassis or some other rigid supporting means.

The channel selector switch 14 is adapted to snap into a selected position. The shaft 18 is accordingly indexed in such a manner that each step-by-step movement of the shaft results in a tuning of the receiver to a different television channel. The indexing means employed may be of any suitable form known in the art, one preferred design being set forth in the Zepp et al. application referred to above.

In describing the operation of the system of Fig. 1, let it first be assumed that the channel selector switch 14 is being manually manipulated from one of its indexed positions to another such position. Such a rotation of the tuning shaft 18 results in a corresponding rotation of the cammed disc 46. The latter, as shown in Fig. 1, is provided with a plurality of cam elements 46*a* positioned in equally-spaced relation on the periphery of the disc. Although normally the number of cams 46*a* employed will be equal to the number of indexed positions of the channel selector switch 14, only four of these cams 46*a* have been shown in Fig. 1 in order to simplify the drawing.

The spring member 50 (Fig. 2) is so associated with the cammed disc 46 that a movement of the channel selector knob 16 to rotate the shaft 18 and hence the disc 46 causes one of the cams 46*a* to bend the spring member 50 away from its neutral position shown in Fig. 1. The cams 46*a* are so spaced on the periphery of the cammed disc 46, however, that this bending action of the spring 50 by a particular cam 46*a* is completed before the channel selector switch 14 indexes into its new position, and the spring 50, being freed from its engagement with the cam, begins to vibrate. The maximum excursions of the spring, or in other words, the vibration envelope of the element 48, is indicated by dotted lines in Fig. 1.

The element 48 has been stated to be composed preferably of magnetic material. Moreover, it is located in the immediate vicinity of the tank circuit 22 which forms part of the local oscillator 20. With such a physical relationship between the units 22 and 48, it will be appreciated that any relative movement therebetween will change the resonant frequency of the tank circuit 22, and hence the output frequency of the oscillator 20 itself. By a proper choice of material for the element 48, and by properly selecting the size and resiliency of the spring 50, as well as the proximity of the elements 22 and 48, the amount by which the oscillator frequency is varied due to vibration of the spring 50 may be such as to cause the IF signal to sweep through a range having limits both above and below the assigned intermediate frequency.

The maximum excursions of the IF signal may lie beyond the lock-in range of the discriminator-reactance control circuit 30—42 during the first few vibrations of the spring 50. However, during each of these initial excursions, the signal in the audio channel will sweep through the AFC circuit lock-in range. Accordingly, an AFC control voltage will be developed by the discriminator 30 during each such sweep period. This control voltage is applied to the reactance control unit 42 so that the latter may be effective to alter the resonant frequency of the oscillator tank circuit 22. Thus, while wide variations in frequency may occur during the switching action of the channel selector switch 14, nevertheless the pull-in device 44 acts cyclically to bring the audio IF signal within the lock-in range of the discriminator-reactance control unit 30—42, and, while the audio IF signal is within this lock-in range, an effective AFC voltage output is developed by the discriminator 30 to bring about a stabilized circuit operation.

It will be apparent that the principles of applicant's invention are not limited to the precise form of lock-in unit illustrated in the drawings and described above. Although the device 44 has been described as including a member 48 composed of magnetic material (such, for example, as a piece of high-permeability iron) which varies the inductance of the tank circuit 22, it might alternatively comprise a grounded conductor near the high-voltage end of the tank circuit 22 the vibration of which varies the tank capacitance, or one of many other types of known electro-mechanical transducers. Also, as mentioned above, the rate of vibration of the spring member 50, and consequently the "hunting" rate of the oscillator 20, is readily controllable by a proper choice of spring material and/or mass of the element 48. This rate may be quite low—10 cycles per second or less—a condition which is not readily obtainable with an electrical "pull-in" system inasmuch as impractically large reactances would then be required in the oscillatory ringing circuit.

As above brought out, the cammed disc 46 may be attached either directly to the main tuning shaft 16 or to any other shaft in the receiver which rotates as a function of the actuation of the tuning knob 16.

Having thus described my invention, I claim:

1. In an automatic frequency control system for television receivers, a local oscillator, means for heterodyning the output of said local oscillator with a television signal containing both audio and video information, a frequency discriminator in the audio section of said receiver, the bandwidth of said discriminator exceeding only slightly the normal bandwidth of the audio IF signal, the latter being subject to fluctuations beyond the range of said discriminator during a tuning of the receiver from one channel to another, means for deriving from said discriminator an AFC voltage whenever the audio IF signal departs from a center IF frequency but remains within the range of the discriminator, an oscillatable element, means for causing said element to oscillate in response to a tuning of the receiver from one channel to another, and means for causing the oscillation of said element to vary the frequency of the local oscillator in such a manner that the audio IF signal is brought within the frequency range of the discriminator in the event that it does not then lie within such range.

2. An AFC system in accordance with claim 1, in which said television receiver is provided with a channel selector switch, and in which the means for causing said element to oscillate in response to a tuning of the receiver from one channel to another includes said channel selector switch.

3. In an AFC system for a television receiver, a local oscillator, means for heterodyning the output of said local oscillator with an incoming signal containing both audio and video information to develop both audio and video IF signals, a frequency discriminator in the audio section of said receiver, a normally-closed switch which is momentarily opened as a function of the tuning of said receiver, said audio IF signal being subject to fluctuations in frequency beyond the range of said discriminator during a tuning of said receiver, means for deriving from said discriminator an AFC voltage whenever the said audio IF signal departs from a preassigned frequency but remains within the range of the discriminator, an oscillatable element which is normally at rest, means for causing said element to oscillate as a function of the momentary opening of said normally-closed switch, and means for causing the oscillation of said element to vary the frequency of the local oscillator in such a manner that the said audio IF signal is brought within the range of said discriminator in the event that it does not then lie within such range.

4. An automatic frequency control system according to claim 3, in which the said local oscillator includes a resonant circuit and in which the said oscillatable element comprises a member composed of magnetic material, said member being positioned to vary the frequency of said resonant circuit in accordance with its oscillatory status.

5. In an automatic frequency control system for a television receiver, a local oscillator, means for heterodyning the output of said local oscillator with an incoming signal containing both audio and video information to develop both audio and video IF signals, a frequency discriminator in the audio section of said receiver, said audio IF signal being subject to fluctuations beyond the range of said discriminator during a tuning of said receiver from one channel to another, means for deriving from said discriminator an AFC voltage whenever the said audio IF signal departs from a center IF frequency but remains within the discriminator frequency range, a normally quiescent vibrator element located in the vicinity of said oscillator, means for causing said element to vibrate in response to a tuning of the receiver from one channel to another, and means for causing the vibration of said element to vary the frequency of the local oscillator in such a manner that the said audio IF signal is brought within the frequency range of the discriminator in the event that it has extended beyond such range during the tuning operation.

6. An AFC system in accordance with claim 5, in which said vibrator element includes a spring one end of which is fixed in position, and a member of magnetic material mounted on the free end of said spring.

7. An AFC system in accordance with claim 6, in which said means for causing said element to vibrate in response to a tuning of the receiver from one channel to another includes a multiple-cammed disc which is adapted to be rotated as a function of the said tuning operation, such a rotation of said disc causing one of the cams to actuate said spring and thereby set the latter in vibration.

8. An AFC system in accordance with claim 7, in which said receiver is provided with a channel selector switch, and in which the said cammed disc is rotated as a function of the operation of such switch.

JULIUS GREEN.

REFERENCES CITED

The following references are of record in the file of this patent:

UNITED STATES PATENTS

| Number | Name | Date |
|---|---|---|
| 2,283,523 | White | May 19, 1942 |
| 2,287,925 | White | June 30, 1942 |
| 2,435,294 | Ginzton | Jan. 13, 1948 |
| 2,466,931 | Crandall | Apr. 12, 1949 |